US012233945B2

(12) United States Patent
Nagai et al.

(10) Patent No.: US 12,233,945 B2
(45) Date of Patent: Feb. 25, 2025

(54) HOOD STRUCTURE FOR VEHICLE

(71) Applicant: SUBARU CORPORATION, Tokyo (JP)

(72) Inventors: Junya Nagai, Tokyo (JP); Akihiro Imaizumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 286 days.

(21) Appl. No.: 17/957,466

(22) Filed: Sep. 30, 2022

(65) Prior Publication Data

US 2023/0115536 A1 Apr. 13, 2023

(30) Foreign Application Priority Data

Oct. 11, 2021 (JP) ................................. 2021-166624

(51) Int. Cl.
*B62D 25/10* (2006.01)
*B62D 25/12* (2006.01)

(52) U.S. Cl.
CPC ............. *B62D 25/12* (2013.01); *B62D 25/10* (2013.01)

(58) Field of Classification Search
CPC ...... B62D 25/10; B62D 25/105; B62D 25/12; E05Y 2900/536
See application file for complete search history.

(56) References Cited

U.S. PATENT DOCUMENTS

| 9,709,120 | B1 * | 7/2017 | Waskie | B32B 3/02 |
| 9,783,236 | B1 * | 10/2017 | Rivera | B62D 25/105 |
| 2005/0023059 | A1 * | 2/2005 | Kamada | B62D 25/105 180/69.21 |
| 2005/0082875 | A1 * | 4/2005 | Ikeda | B62D 25/105 296/193.11 |
| 2015/0054305 | A1 * | 2/2015 | Steinhilb | B60R 21/34 296/187.04 |
| 2015/0191205 | A1 * | 7/2015 | Gardynik | B62D 25/105 296/193.11 |
| 2015/0307135 | A1 * | 10/2015 | Lindmark | B62D 25/105 296/191 |
| 2017/0225720 | A1 * | 8/2017 | Sanders | B62D 25/105 |
| 2019/0315305 | A1 * | 10/2019 | Hammer | B62D 25/12 |
| 2020/0307713 | A1 * | 10/2020 | Nishino | B62D 25/105 |
| 2020/0391805 | A1 * | 12/2020 | Kashima | E05B 85/045 |
| 2021/0061367 | A1 * | 3/2021 | Hahnlen | B21D 22/02 |
| 2021/0300478 | A1 * | 9/2021 | Onaka | B62D 25/12 |
| 2021/0300479 | A1 * | 9/2021 | Onaka | B62D 25/105 |
| 2022/0105989 | A1 * | 4/2022 | Cote | B62D 25/12 |

(Continued)

FOREIGN PATENT DOCUMENTS

JP 2005-059609 A 3/2005

*Primary Examiner* — Gregory A Blankenship
(74) *Attorney, Agent, or Firm* — MCGINN I.P. LAW GROUP, PLLC

(57) ABSTRACT

A hood structure for a vehicle includes an outer panel on an upper side and an inner panel on a lower side. The outer panel and the inner panel are arranged to overlap each other in a plan view. The outer panel has a recessed portion extending substantially in a longitudinal direction and recessed downward, the inner panel has holed portions at least partially overlapping the recessed portion of the outer panel in the plan view, and at least two of the holed portions are arranged spaced from each other in the longitudinal direction.

9 Claims, 5 Drawing Sheets

(56) References Cited

U.S. PATENT DOCUMENTS

| | | | | |
|---|---|---|---|---|
| 2023/0111971 A1* | 4/2023 | Nagai | ............ | B62D 21/15 |
| | | | | 296/187.09 |
| 2023/0112540 A1* | 4/2023 | Nishimura | ............ | B60R 21/34 |
| | | | | 296/187.04 |
| 2023/0115536 A1* | 4/2023 | Nagai | ............ | B62D 25/12 |
| | | | | 49/501 |
| 2023/0117169 A1* | 4/2023 | Ishizuka | ............ | B62D 25/105 |
| | | | | 180/69.2 |
| 2023/0150582 A1* | 5/2023 | Miadowitz | ............ | B62D 25/12 |
| | | | | 296/181.2 |

* cited by examiner

HOOD STRUCTURE FOR VEHICLE

CROSS-REFERENCE TO RELATED APPLICATIONS

The present application claims priority from Japanese Patent Application No. 2021-166624 filed on Oct. 11, 2021, the entire contents of which are hereby incorporated by reference.

BACKGROUND

The disclosure relates to a hood structure for a vehicle, the hood structure including an outer panel and an inner panel.

In an example of a proposed hood structure for a vehicle, a downward recessed portion with a longitudinal length of 600 mm or less and a width of 50 mm or less is formed in an outer panel (see, for example, Japanese Unexamined Patent Application Publication No. 2005-59609).

SUMMARY

An aspect of the disclosure provides a hood structure for a vehicle. The hood structure includes an outer panel on an upper side and an inner panel on a lower side. The outer panel and the inner panel are arranged to overlap each other in a plan view. The outer panel has a recessed portion extending substantially in a longitudinal direction and recessed downward. The inner panel has holed portions at least partially overlapping the recessed portion of the outer panel in the plan view. At least two of the holed portions are arranged spaced from each other in the longitudinal direction.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

When the longitudinally extending recessed portion is formed in the outer panel, there is a possibility that the recessed portion is harder to deform than other portions in case of collision, for example, and collision performance is adversely affected.

It is desirable to provide a hood structure for a vehicle with which, even when a longitudinally extending recessed portion is formed in an outer panel, the recessed portion can be caused to deform in case of collision, for example.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
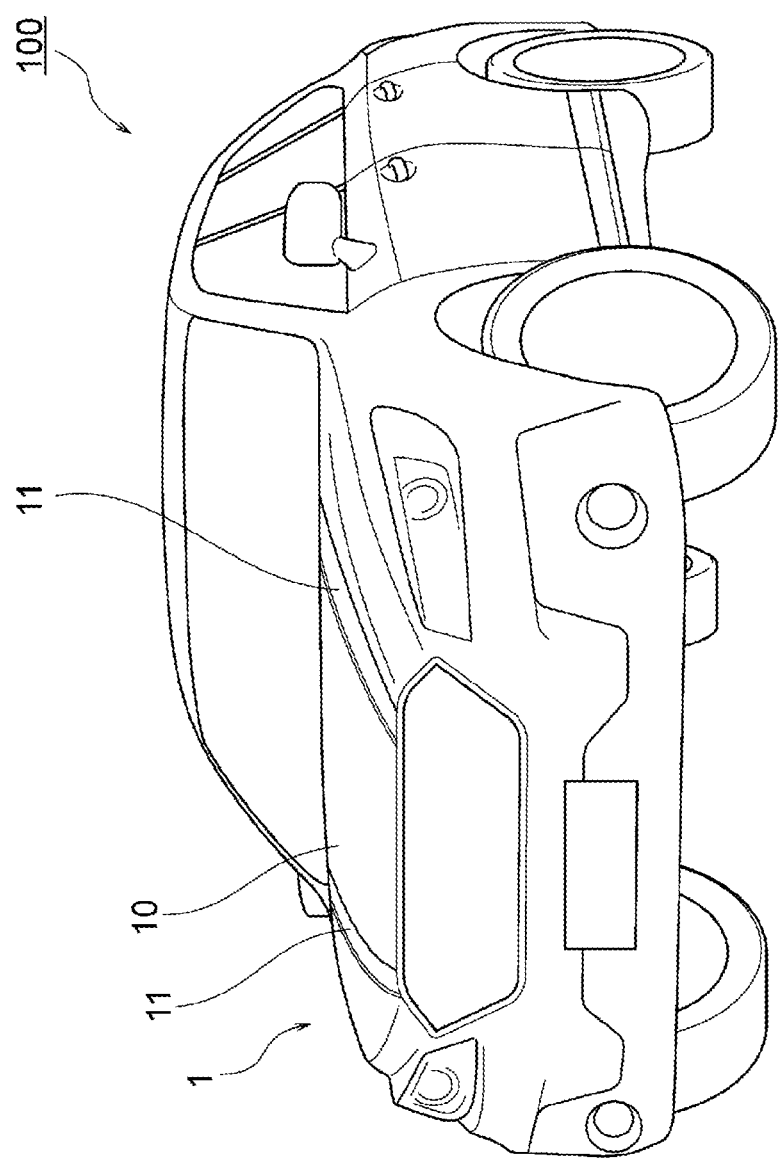
FIG. 1 is an external perspective view of a vehicle, the view illustrating an embodiment of the disclosure.
Figure 2:
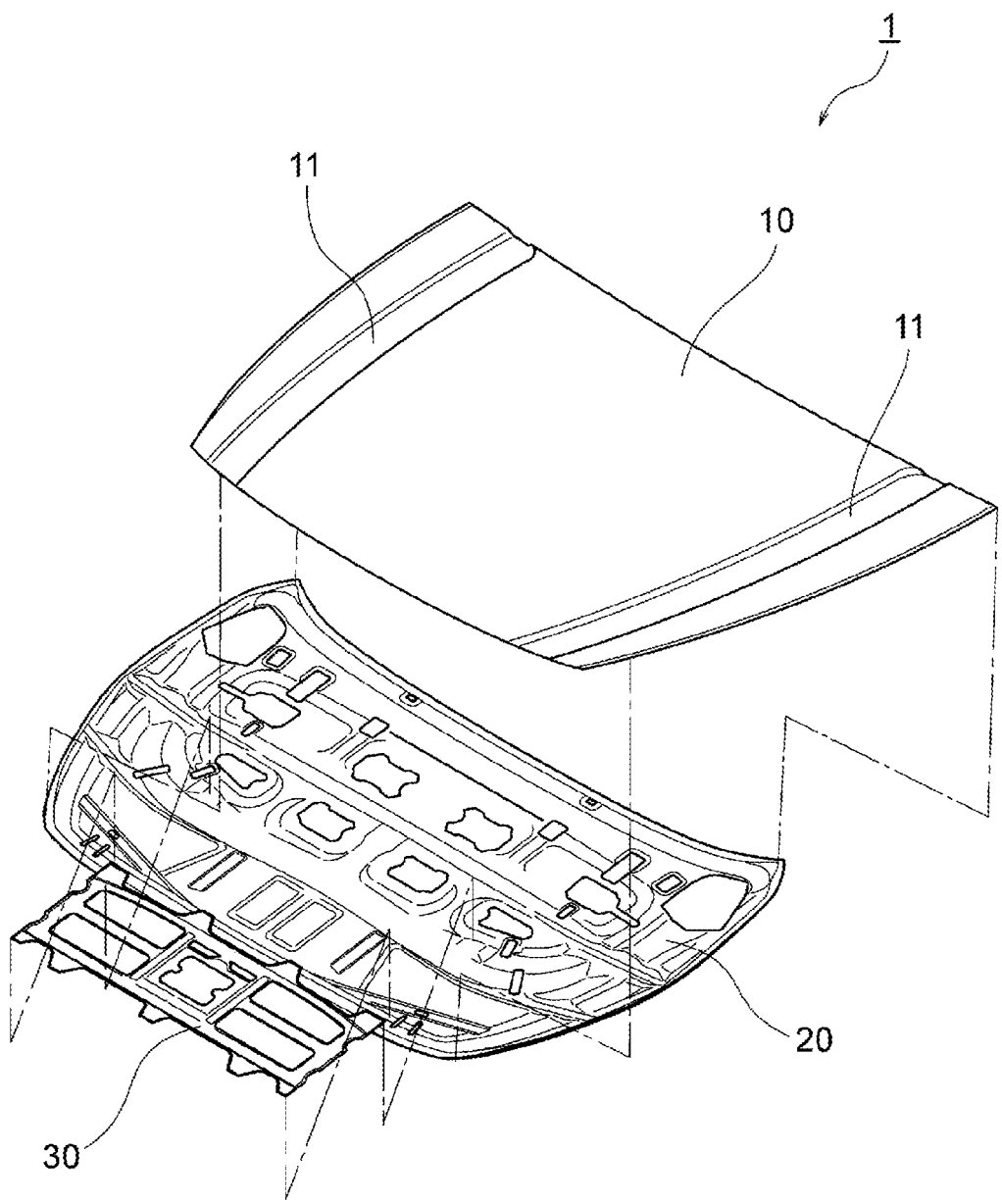
FIG. 2 is an exploded perspective view of a hood structure.
Figure 3:
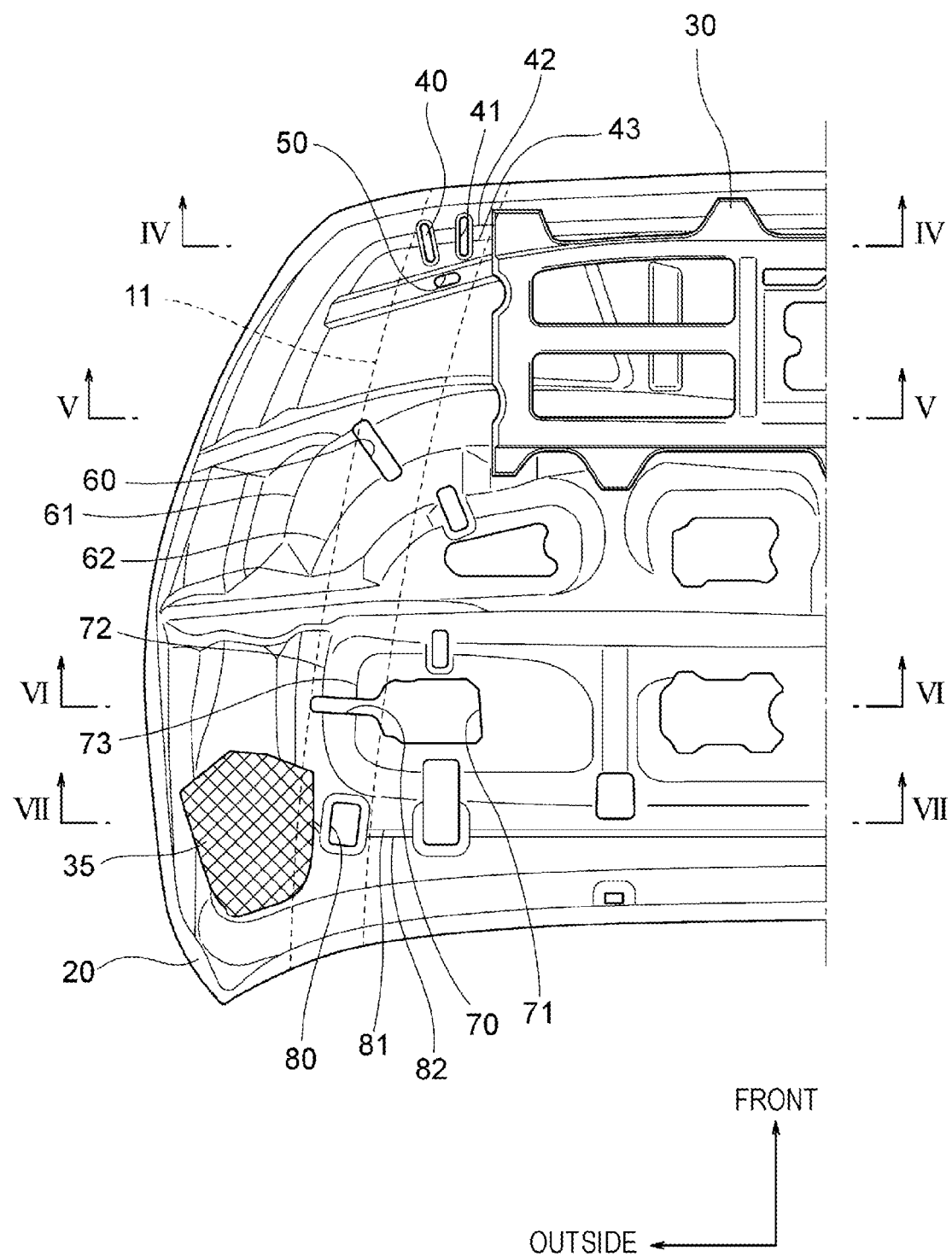
FIG. 3 is a partial bottom view of an inner panel.
Figure 4:
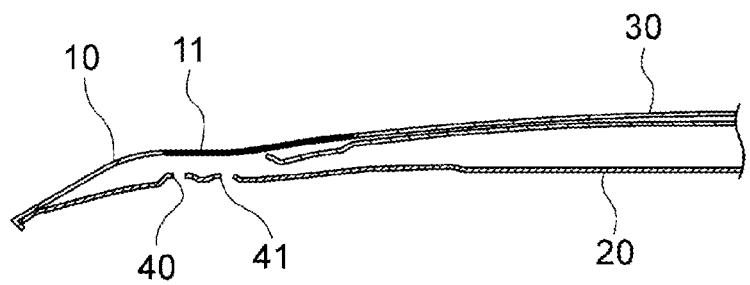
FIG. 4 is a sectional view taken along IV-IV in FIG. 3.
Figure 5:
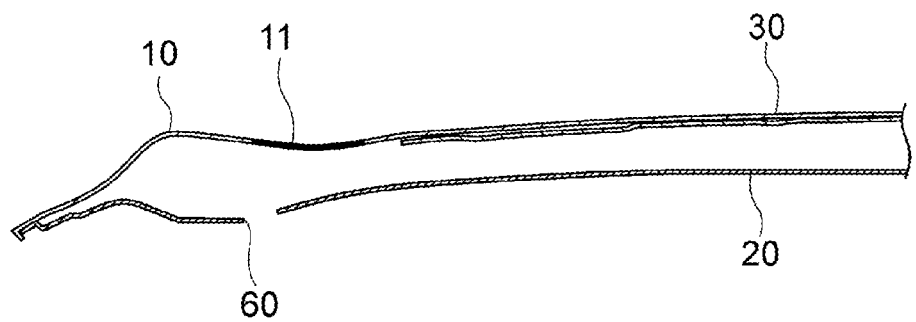
FIG. 5 is a sectional view taken along V-V in FIG. 3.
Figure 6:
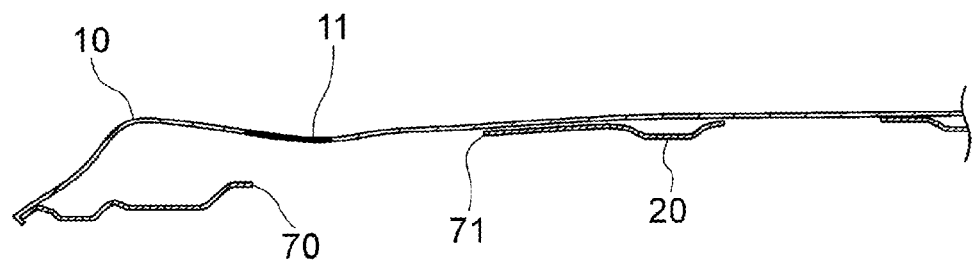
FIG. 6 is a sectional view taken along VI-VI in FIG. 3.
Figure 7:
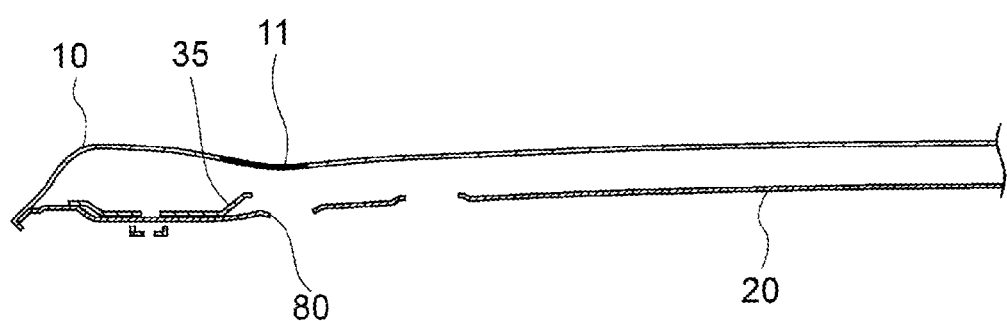
FIG. 7 is a sectional view taken along VII-VII in FIG. 3.

FIGS. 1 to 7 illustrate the embodiment of the disclosure. FIG. 1 is an external perspective view of a vehicle, which illustrates the embodiment of the disclosure. FIG. 2 is an exploded perspective view of a hood structure. FIG. 3 is a partial bottom view of an inner panel. FIG. 4 is a sectional view taken along IV-IV in FIG. 3. FIG. 5 is a sectional view taken along V-V in FIG. 3. FIG. 6 is a sectional view taken along VI-VI in FIG. 3. FIG. 7 is a sectional view taken along VII-VII in FIG. 3.

As illustrated in FIG. 1, the vehicle 100 includes the hood structure 1 covering an engine room from above. The hood structure 1 includes an outer panel 10 providing a design surface, and a recessed portion 11 extending in a longitudinal direction is formed in the outer panel 10. In this embodiment, a pair of left and right recessed portions 11 are formed in outer regions of the outer panel 10 in a width direction of the vehicle to span from a front region to a rear region thereof.

In the hood structure 1, as illustrated in FIG. 2, the outer panel 10 on an upper side and the inner panel 20 on a lower side are arranged to overlap each other in a plan view. A reinforced panel 30 is disposed on a front end side of a lower surface of the inner panel 20 corresponding to a locking mechanism (not illustrated) that is disposed on a front end side of the hood structure 1. The hood structure 1 is in a plate-like form as a whole defined by the outer panel 10, the inner panel 20, and the reinforced panel 30. Materials of the outer panel 10, the inner panel 20, and the reinforced panel 30 are optionally selectable. For example, metal or plastic can be used, and aluminum is used in this embodiment.

As illustrated in FIG. 3, a bracket 35 to which a hinge is to be attached is disposed on a rear end side of the inner panel 20 in an outer region thereof in the width direction of the vehicle. In FIG. 3, the bracket 35 is denoted by cross hatching to distinguish the bracket from holed portions 40, 41, 50, 60, 70 and 80, and so on. The inner panel 20 has the holed portions 40, 41, 50, 60, 70 and 80 at least partially overlapping the recessed portion 11 of the outer panel 10 in a plan view. In this embodiment, the holed portions 40, 41, 50, 60, 70 and 80 are arranged at intervals in the longitudinal direction over a region from the front end side to the rear end side of the inner panel 20 except that the first outer holed portion 40 and the first inner holed portion 41 are arranged side by side in the width direction of the vehicle.

The first outer holed portion 40 and the first inner holed portion 41 are formed adjacent to each other outside the reinforced panel 30 in the width direction of the vehicle on a front end side of the reinforced panel 30 and are formed at an interval therebetween in the width direction of the vehicle, namely in a width direction of the recessed portion 11. The first outer holed portion 40 and the first inner holed portion 41 are formed across a first ridge 42 and a second ridge 43 behind the first ridge 42. The first ridge 42 extends in a left-right direction in a region where the first outer holed portion 40 and the first inner holed portion 41 are formed. The first ridge 42 is defined by a substantially horizontal surface on a front side and a rearward sloped surface on a rear side. The second ridge 43 also extends in the left-right direction in the region where the first outer holed portion 40 and the first inner holed portion 41 are formed. The second ridge 43 is defined by a rearward sloped surface on a front side and a substantially horizontal surface on a rear side. The first outer holed portion 40 and the first inner holed portion 41 are formed as portions having elongate holes extending substantially orthogonal to the first ridge 42 and the second ridge 43. In this embodiment, the first inner holed portion 41 extends in the longitudinal direction, and the first outer holed portion 40 is slightly inclined outward in the width direction of the vehicle while extending forward.

The second holed portion 50 is arranged behind the first outer holed portion 40 and the first inner holed portion 41. The second holed portion 50 is formed as a portion having an elongate hole that is slightly inclined forward while extending toward an inner side in the width direction of the vehicle. The first outer holed portion 40, the first inner holed portion 41, and the second holed portion 50 are arranged on the front end side of the inner panel 20.

The third holed portion 60 is arranged in a longitudinal central region of the inner panel 20 at a position slightly deviated forward. The third holed portion 60 is formed across a third ridge 61 and a fourth ridge 62 positioned on an obliquely rear and inner side of the third ridge 61 in the width direction of the vehicle. The third ridge 61 extends obliquely rearward toward an outer side in the width direction of the vehicle in a region where the third holed portion 60 is formed. The third ridge 61 is defined by a substantially horizontal surface on a front side and a rearward-ascending sloped surface on a rear side. The fourth ridge 62 also extends obliquely rearward toward the outer side in the width direction of the vehicle in the region where the third holed portion 60 is formed. The fourth ridge 61 is defined by a rearward-ascending sloped surface on a front side and a substantially horizontal surface on a rear side. The third holed portion 60 is formed as a portion having an elongate hole extending in a direction substantially orthogonal to the third ridge 61 and the fourth ridge 62. In this embodiment, the third holed portion 60 is inclined toward the outer side in the width direction of the vehicle while extending forward.

The fourth holed portion 70 is arranged in the longitudinal central region of the inner panel 20 at a position slightly deviated rearward. In this embodiment, the fourth holed portion 70 is formed in continuation with a large-size holed portion 71 that has a relatively large size and that is formed on the inner side in the width direction of the vehicle. The fourth holed portion 70 is formed across a fifth ridge 72 and a sixth ridge 73 positioned on an inner side of the fifth ridge 72 in the width direction of the vehicle. The fifth ridge 72 extends longitudinally in a region where the fourth holed portion 70 is formed. The fifth ridge 72 is defined by a substantially horizontal surface on an outer side in the width direction of the vehicle and an inward-ascending sloped surface on an inner side in the width direction of the vehicle. The sixth ridge 73 also extends longitudinally in the region where the fourth holed portion 70 is formed. The sixth ridge 73 is defined by an inward-ascending sloped surface on an outer side in the width direction of the vehicle and a substantially horizontal surface on an inner side in the width direction of the vehicle. The fourth holed portion 70 is formed as a portion having an elongate hole extending in a direction substantially orthogonal to the fifth ridge 72 and the sixth ridge 73. In this embodiment, the fourth holed portion 70 is formed to extend from the large-size holed portion 71 outward in the width direction of the vehicle.

The fifth holed portion 80 is formed adjacent to an inner end of the bracket 35 in the width direction of the vehicle. The fifth holed portion 80 is formed across a seventh ridge 81 and an eighth ridge 82 behind the seventh ridge 81. The seventh ridge 81 extends in the left-right direction in a region where the fifth holed portion 80 is formed. The seventh ridge 81 is defined by a substantially horizontal surface on a front side and a rearward-descending sloped surface on a rear side. The eighth ridge 82 also extends in the left-right direction in the region where the fifth holed portion 80 is formed. The eighth ridge 82 is defined by a rearward-descending sloped surface on a front side and a substantially horizontal surface on a rear side. The fifth holed portion 80 is formed in a rectangular shape extending in a direction substantially orthogonal to the seventh ridge 81 and the eighth ridge 82.

With the hood structure 1 described above, the inner panel 20 is more easily deformable in the regions where the holed portions 40, 41, 50, 60, 70 and 80 are formed than other portions of the inner panel 20. In case of collision of the vehicle, since a load is applied to the outer panel 10 and the inner panel 20 in an integral structure from a collision object approaching the vehicle from a front side substantially rearward, deformation of the outer panel 10 in the regions where the recessed portion 11 overlaps the holed portions 40, 41, 50, 60, 70 and 80 of the inner panel 20 in a plan view is promoted with the presence of the holed portions 40, 41, 50, 60, 70 and 80 of the inner panel 20. Furthermore, since the holed portions 40, 41, 50, 60, 70 and 80 are arranged at intervals therebetween along the longitudinal direction, the deformation is promoted in zones of the longitudinally extending recessed portion 11 corresponding to zones between adjacent twos of the holed portions 40, 41, 50, 60, 70 and 80. In this embodiment, since the second holed portion 50, the third holed portion 60, and the fourth holed portion 70 are arranged in mentioned order over the region spanning from the first outer holed portion 40 and the first inner holed portion 41 both on the front end side of the inner panel 20 to the fifth holed portion 80 on the rear end side of the inner panel 20, the deformation is promoted over an entire zone of the recessed portion 11 that is formed in the outer panel 10 to span from the front region to the rear region thereof.

In this embodiment, since the first outer holed portion 40 and the first inner holed portion 41 are arranged side by side in the width direction of the recessed portion 11, the first outer holed portion 40 and the first inner holed portion 41 can be formed in relatively small sizes in the width direction of the recessed portion 11, and deformation performance of the hood structure 1 in case of, for example, collision of the vehicle can be ensured without notedly impairing rigidity and strength of the inner panel 20.

In this embodiment, since some of the holed portions 40, 41, 50, 60, 70 and 80 are positioned across the ridges 42, 43, 61, 62, 72, 73, 81 and 82, the ridges 42, 43, 61, 62, 72, 73, 81 and 82 of the inner panel are partially cut off by the holed portions 40, 41, 50, 60, 70 and 80. Accordingly, the deformation can be reliably caused in case of the collision of the vehicle, for example, in the regions where the holed portions 40, 41, 50, 60, 70 and 80 are formed in the inner panel 20.

While the above embodiment has been described in connection with an example in which six holed portions at least partially overlapping the recessed portion 11 of the outer panel 10 in a plan view are formed in the inner panel 20, at least two holed portions are to be arranged at an interval therebetween in the longitudinal direction. While the recessed portion 11 is formed in the outer panel 10 to span from the front region to the rear region thereof, the recessed portion may be formed in a partial region of the outer panel 10 in the longitudinal direction. While the above embodiment is described in connection with an example in which five among the six holed portions of the inner panel 20 are positioned across the ridges, the number of the holed portions positioned across the ridges can be changed as desired. In another example, all the holed portions may be positioned across the ridges, or all the holed portions may be positioned across no ridges.

The embodiment of the disclosure has been described above, but the above embodiment is not intended to limit the scope defined in Claims. It is to be noted that all of combinations of the features described in the embodiment are not to be used to implement the disclosure in some cases.

With the hood structure for the vehicle according to the disclosure, even when the longitudinally extending recessed portion is formed in the outer panel, the recessed portion can be caused to deform in case of collision, for example.

The invention claimed is:

1. A hood structure for a vehicle, the hood structure comprising:
    an outer panel on an upper side;
    an inner panel on a lower side; and
    a reinforced panel disposed on a front end side of the inner panel,
    wherein the outer panel and the inner panel are arranged to overlap each other in a plan view,
    wherein the outer panel has a recessed portion extending substantially in a longitudinal direction and recessed downward,
    wherein the inner panel has holed portions at least partially overlapping the recessed portion of the outer panel in the plan view,
    wherein at least two of the holed portions are arranged spaced from each other in the longitudinal direction,
    wherein at least two of the holed portions include, on a front outer side of the reinforced panel, a first outer holed portion, and a first inner holed portion adjacent to the first outer holed portion in a width direction of the recessed portion, and
    wherein the first outer holed portion and the first inner holed portion at least partially overlaps the recessed portion of the outer panel in the plan view.

2. The hood structure for the vehicle according to claim 1, wherein the recessed portion is formed in the outer panel to span from a front region of the outer panel to a rear region of the outer panel.

3. The hood structure for the vehicle according to claim 1, wherein the inner panel has a ridge, and
    wherein at least one of the holed portions is positioned across the ridge and extends in a direction substantially orthogonal to the ridge.

4. The hood structure for the vehicle according to claim 2, wherein the inner panel has a ridge, and
    wherein at least one of the holed portions is positioned across the ridge and extends in a direction substantially orthogonal to the ridge.

5. The hood structure for the vehicle according to claim 1, wherein at least two of the holed portions are inclined in a width direction of the vehicle.

6. The hood structure for the vehicle according to claim 1, wherein at least one of the holed portions is an elongated hole extending in an orthogonal direction to the longitudinal direction of the vehicle.

7. The hood structure for the vehicle according to claim 1, wherein the first outer holed portion and the first inner holed portion are across a ridge of the inner panel extending in a direction intersecting the longitudinal direction.

8. The hood structure for the vehicle according to claim 1, wherein at least two of the holed portions further include a second holed portion disposed behind the first outer holed portion and the first inner holed portion.

9. The hood structure for the vehicle according to claim 1, wherein a bracket configured to be attached a hinge is disposed on a rear end side of the inner panel, and at least two of the holed portions further include a third holed portion formed adjacent to an inner end of the bracket.

* * * * *